United States Patent
Allen et al.

(10) Patent No.: US 7,100,565 B2
(45) Date of Patent: Sep. 5, 2006

(54) DOD THROTTLING AND INTAKE CONTROL

(75) Inventors: Jeffrey J. Allen, Brighton, MI (US); Alexander J. Roberts, Rochester, MI (US); Thomas E. Bolander, Flint, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/772,845

(22) Filed: Feb. 5, 2004

(65) Prior Publication Data

US 2005/0172934 A1   Aug. 11, 2005

(51) Int. Cl.
   *F02D 7/00*   (2006.01)
   *F02D 41/04*   (2006.01)

(52) U.S. Cl. .............. 123/198 F; 123/399; 123/481

(58) Field of Classification Search ........... 123/198 F, 123/481, 399
   See application file for complete search history.

(56) References Cited

U.S. PATENT DOCUMENTS

| | | | | |
|---|---|---|---|---|
| 4,107,921 A | * | 8/1978 | Iizuka | 60/288 |
| 4,144,864 A | * | 3/1979 | Kato et al. | 123/198 F |
| 4,483,288 A | * | 11/1984 | Ueno et al. | 123/198 F |
| 5,562,086 A | * | 10/1996 | Asada et al. | 123/568.21 |

FOREIGN PATENT DOCUMENTS

GB    2219829 A   * 12/1989

\* cited by examiner

*Primary Examiner*—Stephen K. Cronin
*Assistant Examiner*—Hyder Ali
(74) *Attorney, Agent, or Firm*—Christopher DeVries

(57) ABSTRACT

A throttling and intake control system transitions between activated and deactivated modes in a displacement on demand engine. The throttling and intake control system includes an intake manifold pressure sensor that generates an intake manifold pressure signal and a controller that calculates a pressure window based on the manifold pressure and an engine speed signal. The controller transitions the engine from the activated mode to the deactivated mode when the measured intake manifold pressure is greater than the maximum limit of the pressure window. The controller transitions the engine from the deactivated mode to the activated mode when the intake manifold pressure is less than the lower limit of the pressure window.

22 Claims, 3 Drawing Sheets

DOD THROTTLING AND INTAKE CONTROL

FIELD OF THE INVENTION

The present invention relates to internal combustion engines, and more particularly to control systems that command transitions in a displacement on demand engine.

BACKGROUND OF THE INVENTION

Some internal combustion engines include engine control systems that deactivate cylinders under low load situations. For example, an eight cylinder can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active).

To smoothly transition between the activated and deactivated modes, the internal combustion engine must produce sufficient drive torque with a minimum of disturbances. Otherwise, the transition will not be transparent to the driver. In other words, excess torque will cause engine surge and insufficient torque will cause engine sag, which degrades the driving experience.

Conventional engine control systems transition between the activated and deactivated modes based on preload, spark retard and/or torque matching algorithms. These control methods have been utilized in combination with fuel delivery systems equipped with a single throttle. Unfortunately, seamless torque transitions have not been accomplished using these systems.

SUMMARY OF THE INVENTION

The present invention provides an engine throttling and intake control system for controlling transitions between activated and deactivated modes in a displacement on demand engine. The engine throttling and intake control system includes multiple throttles through separate channels in an intake manifold. A controller determines if conditions exist to increase or reduce the number of active cylinders based on data collected from manifold absolute pressure sensors. The controller signals individual throttles to increase fuel delivery to predetermined cylinders while other throttles are signaled to decrease fuel delivery to other cylinders to produce a smooth torque curve.

One feature of the present invention includes a calibration to control the rate of change of throttle positions to assure the total torque requested by the driver is maintained while the output from various cylinders is varied.

In another feature, the manifold absolute pressure is measured to determine engine load. Engine speed is also measured to determine if deactivation or activation of certain cylinders is merited.

In another feature of the present invention, air flow, manifold absolute pressure, temperature and engine speed are used to calculate torque. The engine throttling and intake control system maintains a smooth output torque during transitions between displacements in the displacement on demand engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
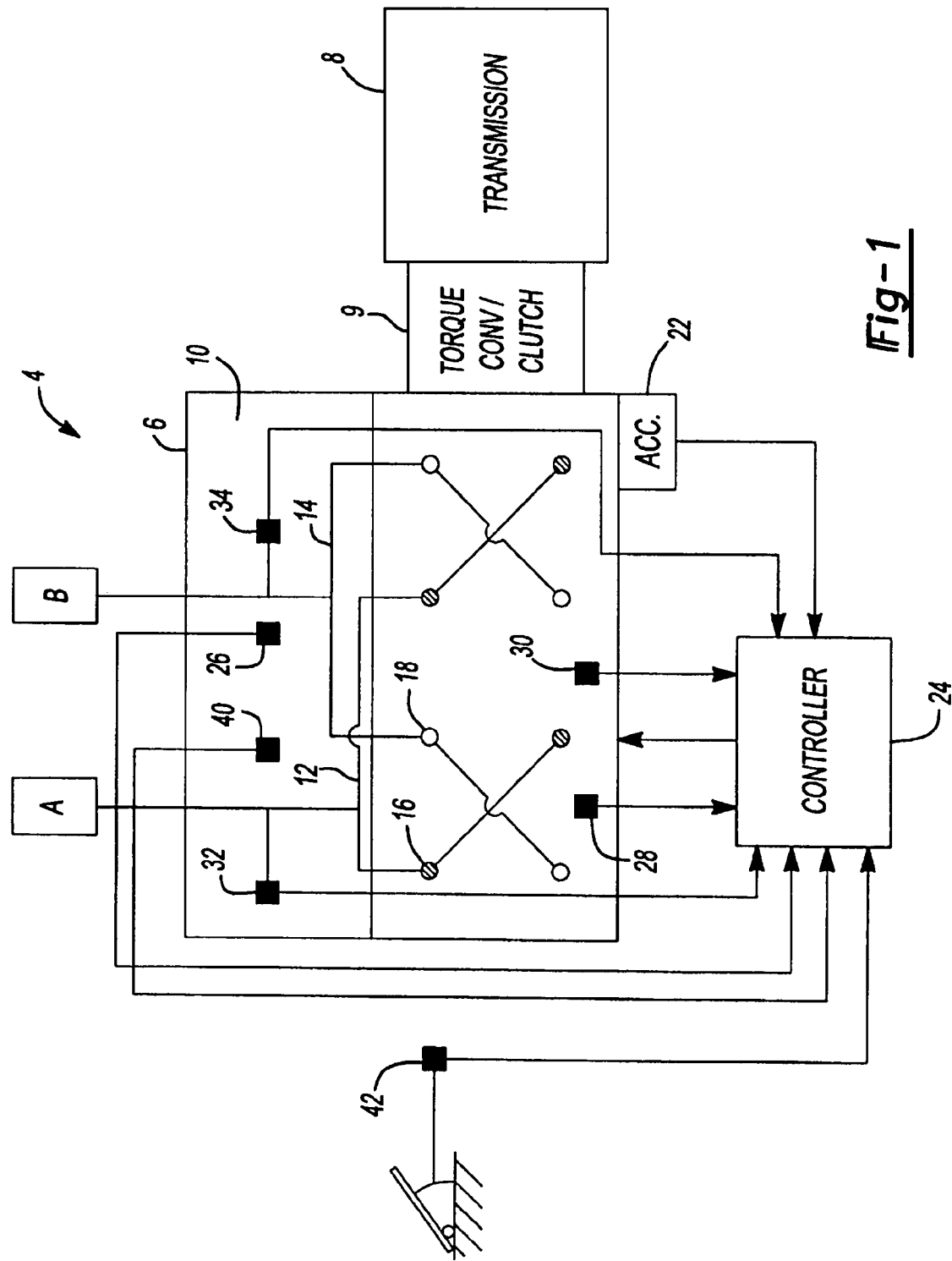
FIG. 1 is a functional block diagram illustrating a vehicle powertrain including a DOD transition control system that employs torque-based moding according to the present invention.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active).

Referring now to FIG. 1, a vehicle 4 includes an engine 6 drivingly coupled to a transmission 8. Transmission 8 is either an automatic or a manual transmission that is driven by the engine 6 through a corresponding torque converter or clutch 9. Air flows into the engine 6 through an intake manifold 10 having a first passageway 12 and a second passageway 14. The first and second passageways are separated from one another. A first set of engine cylinders 16 is in communication with first passageway 12 to receive an air/fuel mixture. A second set of engine cylinders 18 is in communication with second passageway 14.

A first throttle A is positioned in communication with first passageway 12 to provide an individually controlled air/fuel mixture to first set of cylinders 16. A second throttle B is in communication with second passageway 14 and second set of cylinders 18. Preferably, the number of sets of cylinders equals the number of throttles present. The air/fuel mixture is subsequently combusted within cylinders 16 and 18. Accessories 22 such as a hydraulic pump, HVAC compressor, and/or alternator are driven by the engine 6.

The engine 6 includes N cylinders. One or more of the cylinders may be selectively deactivated during engine operation. Although FIG. 1 depicts eight cylinders (N=8), it can be appreciated that the engine 6 may include additional or fewer cylinders. For example, engines having 4, 5, 6, 8, 10, 12 and 16 cylinders are contemplated. It should be appreciated that engines having more than two throttles are also contemplated. An eight cylinder engine may likely include 2, 4 or 8 throttles without departing from the scope of the present invention.

A controller 24 communicates with the engine 6 and various sensors discussed herein. An air flow sensor 26 generates a signal based on the rate of air flow through intake manifold 10. An engine speed sensor 28 generates a signal based on engine speed. An engine temperature sensor 30 generates a signal based on engine temperature. A first intake manifold pressure sensor 32 generates a signal based on a vacuum pressure within first passageway 12. A second intake manifold pressure sensor 34 generates a signal based on vacuum pressure within second passageway 14. An intake air temperature sensor 40 generates a signal based on intake air temperature. An accelerator pedal position sensor 42 generates a signal based on accelerator pedal position.

When light engine load occurs, the controller 24 transitions the engine 6 to the deactivated mode. In an exemplary embodiment, N/2 cylinders are deactivated, although one or more cylinders may be deactivated. Upon deactivation of the selected cylinders, the controller 24 increases the power output of the remaining cylinders. The controller 24 provides DOD transition by controlling multiple throttles as will be described below.

Figure 2:
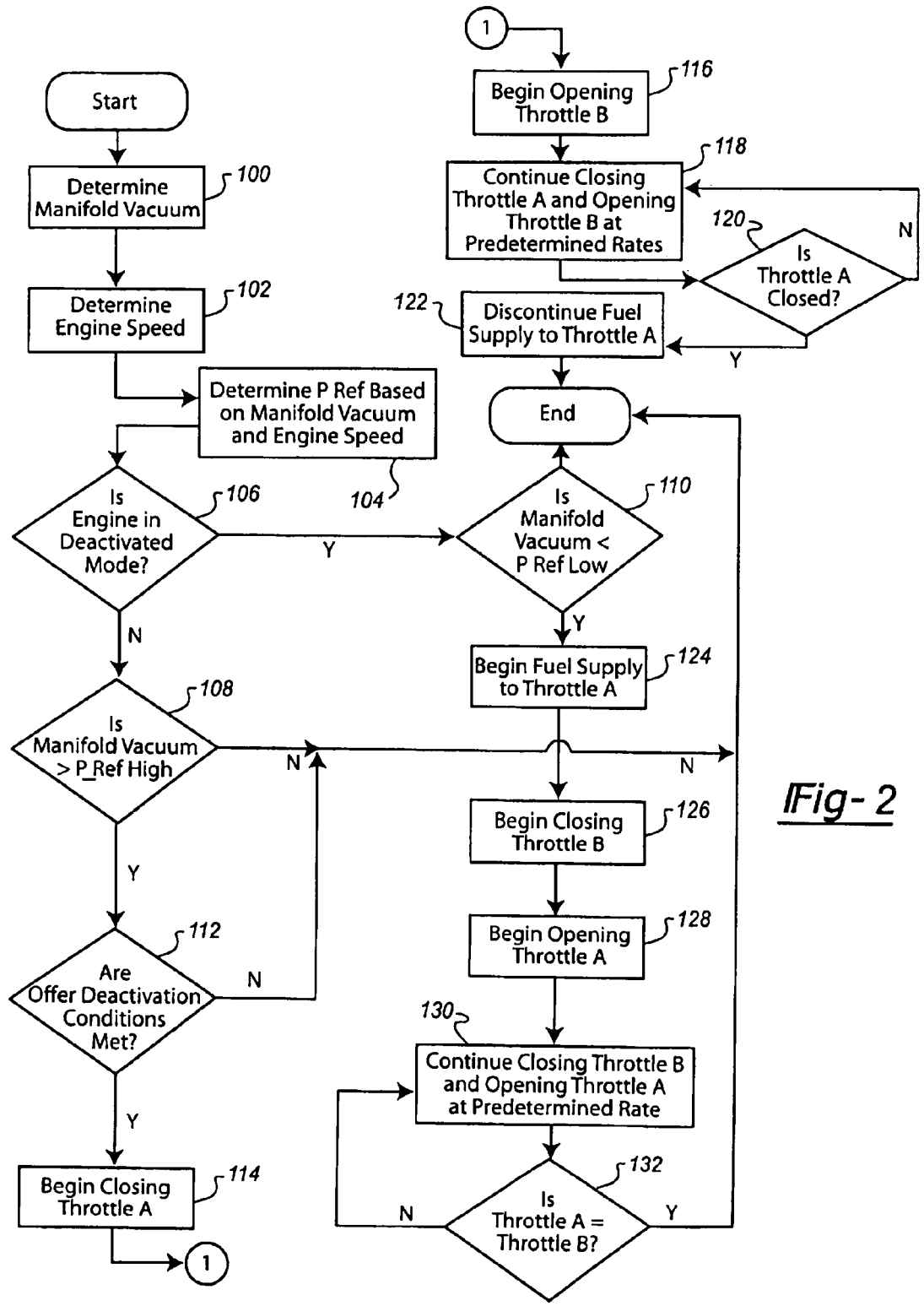
FIG. 2 is a flowchart illustrating steps performed by the DOD transition control system according to the present invention.

Referring to FIG. 2, steps of a DOD transition control method according to the present invention are shown. In step 100, the outputs from intake manifold pressure sensors 32 and 34 are converted to manifold vacuum. Manifold vacuum is an indicator of engine load. The higher the intake manifold vacuum, the lower the engine load.

In step 102, engine speed sensor 28 provides a signal indicative of the engine speed. In step 104, controller 24 calculates a reference pressure window which ranges from $P_{ref\ low}$ to $P_{ref\ high}$. If the manifold vacuum is within the pressure window a change from the status quo will not occur. For example, if engine 6 is operating in the activated mode at 1000 rpm, deactivation of cylinders will not occur until the manifold vacuum exceeds a $P_{ref\ high}$ of 45 kPa.

Step 106 determines whether engine 6 is currently operating in a deactivated mode. If false, controller 24 continues with step 108. If the engine is presently operating in the deactivated mode, controller 24 proceeds with step 110.

In step 108, the presently measured manifold vacuum is compared with $P_{ref\ high}$. The deactivation threshold is determined from a look-up table based on engine speed. If the presently measured intake manifold pressure is not greater than $P_{ref\ high}$, this indicates that the engine is under load and not in condition for entry into the deactivation mode. If the present manifold vacuum is greater than $P_{ref\ high}$, the engine is under a relatively light load and controller 24 continues to step 112.

In step 112, controller 24 determines whether other transition conditions are met. These conditions include engine speed, transmission gear, oil pressure, oil temperature, brake booster vacuum, battery voltage, and/or sensor (e.g. MAP, MAF, TPS, oil temperature) malfunction. It will be appreciated that the transition conditions provided herein are merely exemplary and not exhaustive of all possible deactivation mode conditions. If the other transition conditions are not met, control ends. Otherwise, controller 24 transitions the engine 6 to begin deactivation at step 114.

In step 114, throttle A begins to close. In step 116, throttle B begins to open. The rate at which throttle A closes and throttle B opens is controlled by controller 24 as depicted in step 118. An exemplary ramp rate of 20% change in throttle position per second allows the deactivation to occur with minimal torque variation.

At step 120, controller 24 determines if throttle A is completely closed. If throttle A is closed, the fuel supply to throttle A is discontinued at step 122. If throttle A is not closed, controller 24 continues operating within step 118 to close throttle A and open throttle B while maintaining a constant torque output from engine 6.

To complete the control logic analysis, reference is once again made to step 106. If the engine is presently in the deactivated mode, controller 24 continues to operate at step 110.

In step 110, controller 24 determines if the present intake manifold vacuum is less than the reference pressure $P_{ref\ low}$. If the present manifold vacuum is greater than $P_{ref\ low}$, control ends. Alternatively, the present manifold vacuum could be compared to $P_{ref\ high}$ to determine if additional cylinders may be deactivated. Depending on the number of cylinders and the number of throttles present within engine 6, additional deactivation may occur. The present example describes an engine having only two throttles. However, an eight cylinder engine may include 2, 4 or 8 throttles. Therefore, in the case of eight throttles, each individual cylinder may be separately controlled.

If the present manifold vacuum is less than $P_{ret\ low}$, controller 24 determines that additional cylinders should be activated. In step 124, fuel supply is provided to throttle A. In step 126, throttle B is instructed to begin to close. In step 128, throttle A begins to open.

In step 130, throttle B continues to be closed while throttle A continues to be opened at a predetermined rate. An exemplary rate of 40% change in throttle position per second assures that torque may be controlled to the driver's request. Additionally, the torque output curve continues to be smooth through implementation of the multi-throttle control as previously described.

In step 132, controller 24 determines if throttle position A equals throttle position B. If so, control ends. If throttle position A does not equal throttle position B, controller 24 continues to operate pursuant to step 130 where throttle B continues to close while throttle A continues to open at a predetermined rate.

The DOD throttling and intake control system of the present invention assures that each set of cylinders if fueled with the proper quantity of air due to the presence of independent throttles. Therefore, the combustion efficiency is increased, the emissions are improved and the power output of the engine is smooth and consistent. Furthermore, the total time of engine operation in displacement on demand mode increases. Additionally, switching in and out of displacement on demand mode based on power inconsistencies during transitions is eliminated.

Figure 3:
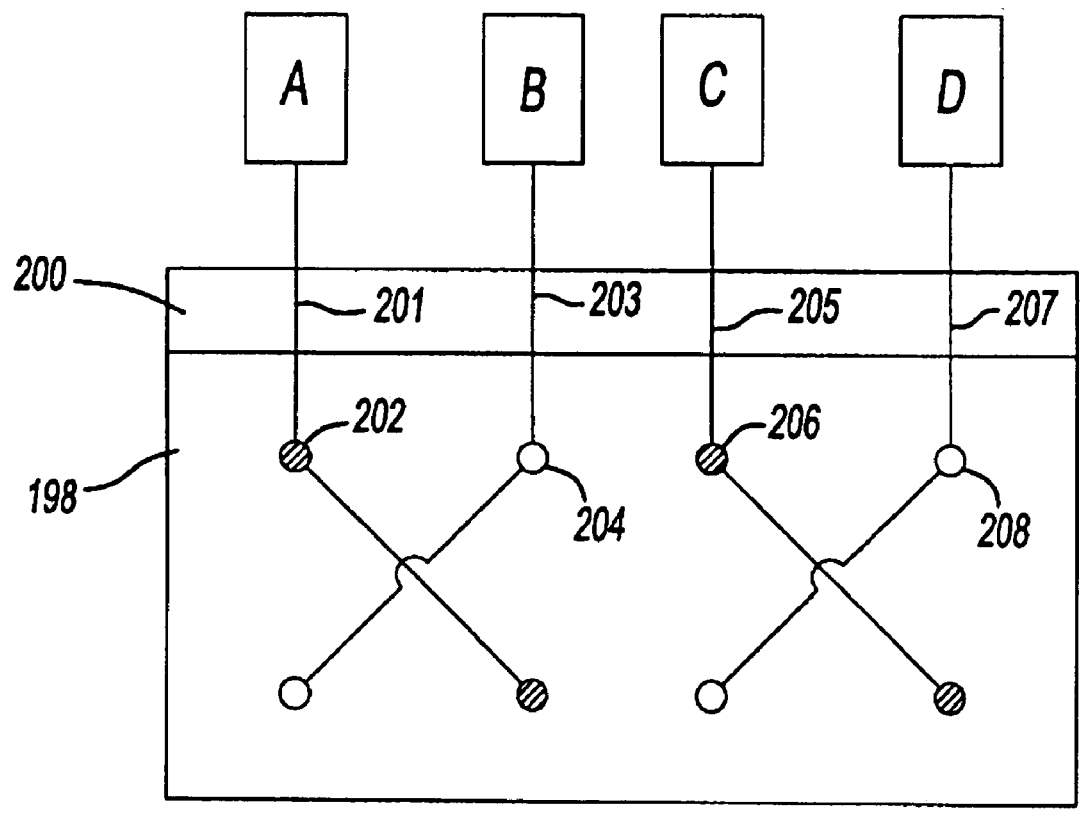
FIG. 3 is a functional block diagram illustrating a vehicle equipped with an alternate embodiment DOD transition control system.

As mentioned earlier, an engine equipped with a DOD throttling and intake control system of the present invention may have any number of throttles. For example, a V8 motor may have 2, 3, 4 or 8 throttles. An alternate embodiment engine 198 is shown in FIG. 3. Engine 198 includes four throttles A, B, C and D coupled to an intake 200 to provide control for 8, 6, 4 and 2 cylinder operation. Throttle A is positioned with a first intake passageway 201. Throttle A is in communication with a first set of cylinders 202. Throttle B provides controlled fuel delivery through a second intake passageway 203 to a second set of cylinders 204. Throttle C is positioned within a third intake passageway 205 and in communication with a third set of cylinders 206. Throttle D is positioned within a fourth intake passageway 207. Throttle D and fourth intake passageway 207 communicate with a fourth set of cylinders 208. The idle of an engine equipped with displacement on demand would be much improved with smaller manifold and throttle systems in communication with every two cylinders. A smaller throttle system would also significantly reduce or eliminate intake noise generated by movement of a larger throttle.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for controlling transitions between activated and deactivated modes in a displacement on demand engine, the control system comprising:
    an engine intake manifold sensor that generates, an intake manifold vacuum signal;
    an engine speed sensor that generates an engine speed signal; and
    a controller that calculates a reference pressure window based on said engine speed signal, that transitions the engine from the activated mode to the deactivated mode when said intake manifold vacuum signal is greater than an upper limit of said reference pressure window, and that transitions the engine from the deactivated mode to the activated mode when said intake manifold vacuum is lower than a lower limit of said reference pressure window, where the engine includes a first throttle in communication with a first set of cylinders and a second throttle in communication with a second set of cylinders, wherein transitioning the engine from the activated mode to the deactivated mode includes closing said first throttle to decrease the power output from the first set of cylinders and opening said second throttle to increase the power output from the second set of cylinders, wherein the total power output from the engine remains substantially constant during transitions between the activated and deactivated modes.

2. An engine control system for controlling transitions between activated and deactivated modes in a displacement on demand engine, the control system comprising:
    an engine intake manifold sensor that generates an intake manifold vacuum signal;
    an engine speed sensor that generates an engine speed signal; and
    a controller that calculates a reference pressure window based on said engine speed signal, that transitions the engine from the activated mode to the deactivated mode when said intake manifold vacuum signal is greater than an upper limit of said reference pressure window, and that transitions the engine from the deactivated mode to the activated mode when said intake manifold vacuum is lower than a lower limit of said reference pressure window, where the engine includes a first throttle in communication with a first set of cylinders and a second throttle in communication with a second set of cylinders, wherein transitioning the engine from the activated mode to the deactivated mode includes closing said first throttle and opening said second throttle.

3. The engine control system of claim 2 wherein the engine includes an intake manifold having first and second passageways, said first passageway being separated from said second passageway and in communication with said first set of cylinders.

4. The engine control system of claim 3 wherein said engine intake manifold sensor is in communication with said first passageway, said control system further including a second intake manifold sensor in communication with said second passageway.

5. The engine control system of claim 2 wherein said upper limit of said reference pressure window equals said lower limit of said reference pressure window.

6. The engine control system of claim 2 wherein said first and second throttles are moved at a predetermined rate.

7. The engine control system of claim 6 wherein the rate of movement of said first throttle substantially equals the rate of movement of said second throttle.

8. The engine control system of claim 7 wherein the rate of moving said throttles is approximately 20% per second when transitioning from the activated mode to the deactivated mode.

9. The engine control system of claim 2 wherein a fuel supply to said first throttle is discontinued after said first throttle is closed.

10. An engine control system for controlling transitions between activated and deactivated modes in a displacement on demand engine, the control system comprising:
    an engine intake manifold sensor that generates an intake manifold vacuum signal;
    an engine speed sensor that generates an engine speed signal; and
    a controller that calculates a reference pressure window based on said engine speed signal, that transitions the engine from the activated mode to the deactivated mode when said intake manifold vacuum signal is greater than an upper limit of said reference pressure window, and that transitions the engine from the deactivated mode to the activated mode when said intake manifold vacuum is lower than a lower limit of said reference pressure window, wherein the engine includes a first throttle in communication with a first set of cylinders and a second throttle in communication with a second set of cylinders, wherein transitioning the engine from the deactivated mode to the activated mode includes opening said first throttle and closing said second throttle.

11. The engine control system of claim 10 wherein said controller is operable to initiate the delivery of fuel to previously deactivated cylinders at an idle rate when transitioning from the deactivated mode to the activated mode.

12. A method for controlling transitions between activated and deactivated modes in a displacement on demand engine having first and second throttles supplying fuel to first and second sets of cylinders, the method comprising:
    determining a reference pressure window;
    comparing an intake manifold vacuum to the pressure window; and
    transitioning from the activated to the deactivated mode when the manifold vacuum is greater than the upper limit of the pressure window, wherein the step of transitioning includes closing the first throttle and opening the second throttle.

13. The method of claim 12 wherein the step of determining a reference pressure window includes determining an engine speed.

14. The method of claim 13 wherein the rate of closing the first throttle is substantially equal to the rate of opening the second throttle.

15. The method of claim 14 further including closing the first throttle and opening the second throttle at a rate of approximately 20 percent per second when transitioning from the activated to the deactivated mode.

16. The method of claim 15 further including discontinuing a supply of fuel to the first set of cylinders after the first throttle is closed.

17. The method of claim 12 further including transitioning from the deactivated mode to the activated mode when the manifold vacuum is less than the lower limit of the pressure window.

18. The method of claim 17 further including initiating the activation of deactivated cylinders by supplying fuel to the deactivated cylinders at an idle rate.

19. The method of claim 17 further including opening the first throttle and closing the second throttle to maintain a substantially constant torque output.

20. The method of claim 19 further including continuing to open the first throttle and close the second throttle until the throttle positions are substantially equal.

21. The method of claim 19 wherein the first throttle is opened at a rate of approximately 40 percent per second.

22. The method of claim 12 further including a third throttle supplying fuel to a third set of cylinders wherein said first, second and third sets of cylinders do not contain a common cylinder.

* * * * *